(12) United States Patent
Krätzig et al.

(10) Patent No.: US 9,220,201 B2
(45) Date of Patent: Dec. 29, 2015

(54) HAND-HELD POWER TOOL

(75) Inventors: David Krätzig, Kornwestheim (DE); Harald Mang, Winnenden (DE); Arne Untermann, Remshalden (DE); Steffen Drexler, Frankenberg (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 827 days.

(21) Appl. No.: 13/415,998

(22) Filed: Mar. 9, 2012

(65) Prior Publication Data
US 2012/0234572 A1 Sep. 20, 2012

(30) Foreign Application Priority Data

Mar. 16, 2011 (DE) .......................... 10 2011 014 068

(51) Int. Cl.
| | |
|---|---|
| *E21B 3/00* | (2006.01) |
| *E21B 17/22* | (2006.01) |
| *E21B 19/16* | (2006.01) |
| *E21B 19/18* | (2006.01) |
| *A01G 3/053* | (2006.01) |
| *B25F 5/00* | (2006.01) |
| *B25F 5/02* | (2006.01) |

(52) U.S. Cl.
CPC ................ *A01G 3/053* (2013.01); *B25F 5/008* (2013.01); *B25F 5/02* (2013.01)

(58) Field of Classification Search
CPC ............ B25F 5/02; B25F 5/00; B25D 16/00; B25D 2250/121; B25D 2250/331; B25D 5/02; B25D 5/001; E21B 4/003
USPC ....................................... 173/39–41, 113, 213
See application file for complete search history.

(56) References Cited

U.S. PATENT DOCUMENTS

| | | | | |
|---|---|---|---|---|
| 3,699,825 A | * | 10/1972 | Misuraca | B23B 45/001 |
| | | | | 15/3.53 |
| 3,760,570 A | | 9/1973 | Ehrlich et al. | |
| 3,807,815 A | * | 4/1974 | Kasabian | ...................... 384/517 |
| 3,809,168 A | * | 5/1974 | Fromm | .......................... 173/13 |
| 3,835,715 A | * | 9/1974 | Howell | ............................ 173/48 |
| 3,848,680 A | * | 11/1974 | Legler | ........................... 173/93.5 |
| 3,903,440 A | * | 9/1975 | Paule et al. | ...................... 310/50 |
| 4,442,906 A | * | 4/1984 | Simpson | ......................... 173/48 |
| 7,168,503 B1 | * | 1/2007 | Teng | ............................... 173/48 |

(Continued)

FOREIGN PATENT DOCUMENTS

| | | |
|---|---|---|
| CN | 101817176 A | 9/2010 |
| CN | 102187789 A | 9/2011 |

(Continued)

*Primary Examiner* — Robert Long
(74) *Attorney, Agent, or Firm* — Gudrun E. Huckett

(57) ABSTRACT

A hand-held power tool has a power tool housing made at least partially of plastic material. A drive motor is arranged in the power tool housing and a drive shaft driven connected to the drive motor is provided. A tool member is connected to the drive shaft and driven by the drive motor through the drive shaft. A first bearing rotatably supports the drive shaft relative to the power tool housing. An intermediate element supports the first bearing relative to the power tool housing. The intermediate element is arranged in a receptacle of the power tool housing and is supported on a support surface relative to the bottom of the receptacle. The support surface is less than approximately 50% of an imaginary circular ring surface defined between an outer circumference of the first bearing and the circumcircle of the receptacle.

16 Claims, 5 Drawing Sheets

(56) References Cited

U.S. PATENT DOCUMENTS

| | | |
|---|---|---|
| 8,667,697 B2 | 3/2014 | Hittmann et al. |
| 2004/0226969 A1* | 11/2004 | Shew .................... 222/333 |
| 2010/0000748 A1* | 1/2010 | Machida et al. ............. 173/48 |
| 2010/0078187 A1* | 4/2010 | Chen ............... B24B 23/022 |
| | | 173/213 |
| 2010/0123359 A1 | 5/2010 | Nishikawa |
| 2010/0218385 A1 | 9/2010 | Mang et al. |
| 2011/0147029 A1* | 6/2011 | Roehm et al. ............. 173/176 |
| 2013/0048330 A1* | 2/2013 | Ikuta ............... B25B 23/141 |
| | | 173/216 |
| 2013/0213684 A1* | 8/2013 | Ikuta ................. B27B 19/006 |
| | | 173/213 |
| 2013/0284475 A1* | 10/2013 | Hirabayashi ........... B25F 5/008 |
| | | 173/47 |
| 2015/0135541 A1* | 5/2015 | Wierzchon ............ B25F 5/006 |
| | | 30/276 |
| 2015/0148175 A1* | 5/2015 | Kierspe ................ B25F 5/001 |
| | | 475/269 |

FOREIGN PATENT DOCUMENTS

| | | |
|---|---|---|
| DE | 23 51 204 A1 | 4/1975 |
| DE | 10 2006 035 387 A1 | 5/2008 |

\* cited by examiner

HAND-HELD POWER TOOL

BACKGROUND OF THE INVENTION

The invention relates to a hand-held power tool, such as a hedge trimmer or the like, that has a power tool housing that at least partially is comprised of plastic material. In the power tool housing, a drive motor is arranged that drives by means of a drive shaft at least one tool member of the power tool. The drive shaft is supported rotatably by means of at least one bearing relative to the power tool housing of the power tool.

It is generally known that power tool housings of hand-held power tools with a drive motor, in particular an electric drive motor, are made of plastic material. The drive shaft that drives the tool member must be supported in the power tool housing of the power tool. A problem in this regard is the heat developed in operation that may cause damage or destruction of the power tool housing.

DE 23 51 204 A1 discloses an electrical machine in which between the bearing and the housing a thermal insulation zone is provided. The thermal insulation zone can be, for example, a coating of the bearing element with a plastic material of low thermal conductivity.

SUMMARY OF THE INVENTION

It is an object of the present invention to provide a hand-held power tool of the aforementioned kind that it is of a simple configuration and has a long service life.

In accordance with the present invention, this is achieved in that the first bearing is supported relative to the power tool housing by means of an intermediate element wherein the intermediate element is arranged in a receptacle of the power tool housing and wherein the intermediate element is supported on a support surface relative to the bottom of the receptacle, wherein the entire support surface is less than approximately 50% of an imaginary circular ring surface, defined between the outer circumference of the first bearing and the circumcircle about the receptacle.

Instead of providing a complex coating on the bearing element, it is thus provided that the first bearing element is arranged in an intermediate element positioned in a receptacle of the power tool housing. The first bearing element is supported on a support surface relative to the bottom of the receptacle. This support surface is less than 50% of an imaginary circular ring surface that is defined between the outer circumference of the first bearing and the circumcircle about the receptacle; the term circumcircle about the receptacle is to be understood as a circle that has its center on the axis of rotation of the bearing element and that has a radius that corresponds to a spacing from the axis of rotation to a point of the receptacle that is farthest removed from the axis of rotation. Since the intermediate element is resting only with at most half of the circular ring surface on the bottom of the receptacle, the heat transfer between the bearing and the power tool housing is reduced. Because of the reduced or low heat transfer between the intermediate element and the power tool housing, it is achieved that the heat that is dissipated from the bearing first spreads uniformly within the intermediate element so that a uniform and delayed heat transfer to the power tool housing is achieved. In this way, an excessive local heating of the power tool housing can be prevented. A complex coating of the bearing is therefore not required. The support surface can be comprised of several partial surfaces wherein the indicated size of the support surface corresponds to the sum of the partial surfaces.

The support surface is advantageously less than approximately 40%, in particular less than approximately 30%, advantageously less than approximately 20%, of the circular ring surface between the outer circumference of the first bearing and the circumcircle about the receptacle. The intermediate element is resting advantageously only with a portion of its projected surface area of its circumference, viewed in the direction of the axis of rotation, on the power tool housing. Advantageously, the plastic material of the intermediate element has a higher thermal resistance than the plastic material of the receptacle in which the intermediate element is arranged. The intermediate element is comprised in particular of polyamide 6.6 while the power tool housing is comprised of a less expensive, less heat-resistant plastic material such as polypropylene. It may be advantageous that the plastic material of the intermediate element and/or the plastic material of the power tool housing are glass fiber-reinforced. However, it is also possible to employ the same plastic material for the intermediate element and the power tool housing.

Advantageously, the support surface is formed by individual support locations that are separated from each other and on which the intermediate element is resting at the bottom of the receptacle in the power tool housing. By this measure, in a simple way a reduced or low heat transfer from the intermediate element into the power tool housing can be achieved. The support locations that are separated from each other, in particular in the form of separate support points, enable an excellent mechanical support action and high stability while providing a minimal support surface.

A simple configuration results when the intermediate element has at least one first rib that is resting on at least one second rib arranged at the bottom of the receptacle. In particular, the second rib crosses the first rib of the intermediate element wherein the crossing point of the first and second ribs forms of support location for the intermediate element. With such a rib structure, individual support locations can be formed in a simple way. At the same time, the ribs have a significantly enlarged surface area compared to an element that is of solid material so that the heat dissipation into the ambient air in the power tool housing is significantly improved. In order to achieve excellent heat dissipation into the air and to prevent in this way that the entire heat that has been absorbed by the intermediate element is transferred onto the power tool housing, it is provided that the intermediate element has a plurality of recesses extending in the direction of the axis of rotation of the drive shaft. In this way, the surface area is enlarged and the heat dissipation into the ambient air is thus improved. In particular, the recesses are formed as openings that extend through the intermediate element and, advantageously, are flowed through by cooling air. In this way, an active cooling action of the intermediate element by means of an air flow passing through is achieved. The power tool housing has advantageously corresponding openings in order to enable air passage through the intermediate element. The intermediate element has in particular a grid-shaped structure that is formed by first and third ribs that cross each other. In this connection, a single first rib or a single third rib may be sufficient when at the same time several third ribs or several first ribs are present, respectively. The grid-shaped structure realizes in a simple way a plurality of openings for cooling air, a large surface area for excellent heat dissipation, a high stability, and a minimal support surface in the power tool housing.

Advantageously, the first ribs project in at least one direction past the third ribs. Only the first ribs but not the third ribs are thus employed at a corresponding side as a contact point to the power tool housing or to the bearing. A simple design results when the first ribs extend, relative to the axis of rotation of the drive shaft, in outward direction, in particular radially relative to the axis of rotation of the drive shaft, and when the third ribs are formed to be annular, in particular have a circular ring shape. A shape that deviates from a circular shape, for example, an elliptical shape, is possible also. Advantageously, the intermediate element is approximately disk-shaped. The first ribs are projecting with their outwardly facing end faces past the outwardly positioned third rib and with their inwardly facing end faces past the inwardly positioned third rib; the inwardly positioned end faces of the first ribs delimit a receiving space for the first bearing. The contact to the first bearing is thus not provided across the entire circumferential surface but only provided by means of the end faces of the first ribs that project past the inwardly positioned third rib. It may be advantageous to provide a single third rib so that the outwardly positioned third rib and the inwardly positioned third rib are one and the same.

Advantageously, on the bottom of the receptacle at least one fourth rib is arranged that crosses the third ribs in a direction of the axis of rotation of the drive shaft and that has a spacing to the intermediate element. Because the fourth rib has a spacing relative to the intermediate element, the support surface of the intermediate element relative to the power tool housing is reduced. Advantageously, at least one fifth rib is provided on the bottom of the receptacle that crosses the fourth rib and is positioned at a spacing to the intermediate element. In this way, ribs extending in both directions can be spaced relative to the intermediate element.

Advantageously, the drive shaft is supported by means of a second bearing that is secured in a drive shaft housing. In order to achieve excellent cooling of the drive shaft housing and thus also of the bearing location, it is provided that the drive shaft housing has at least one cooling rib on its exterior side. The second bearing is advantageously the bearing that has a greater spacing relative to the tool member than the first bearing so that sufficient space is provided for guiding the cooling air. Adjacent to the drive shaft housing there is advantageously at least one first flow guiding rib that guides a cooling air flow, conveyed by a fan wheel, past the at least one cooling rib. In particular, at least one second flow guiding rib is provided which guides the cooling air flow across at least a section of the exterior side of the first flow guiding rib that is facing away from the cooling rib. By deflection of the cooling air flow by means of the second flow guiding rib, an excellent heat dissipation away from the drive shaft housing can be achieved.

DESCRIPTION OF THE PREFERRED EMBODIMENTS

Figure 1:
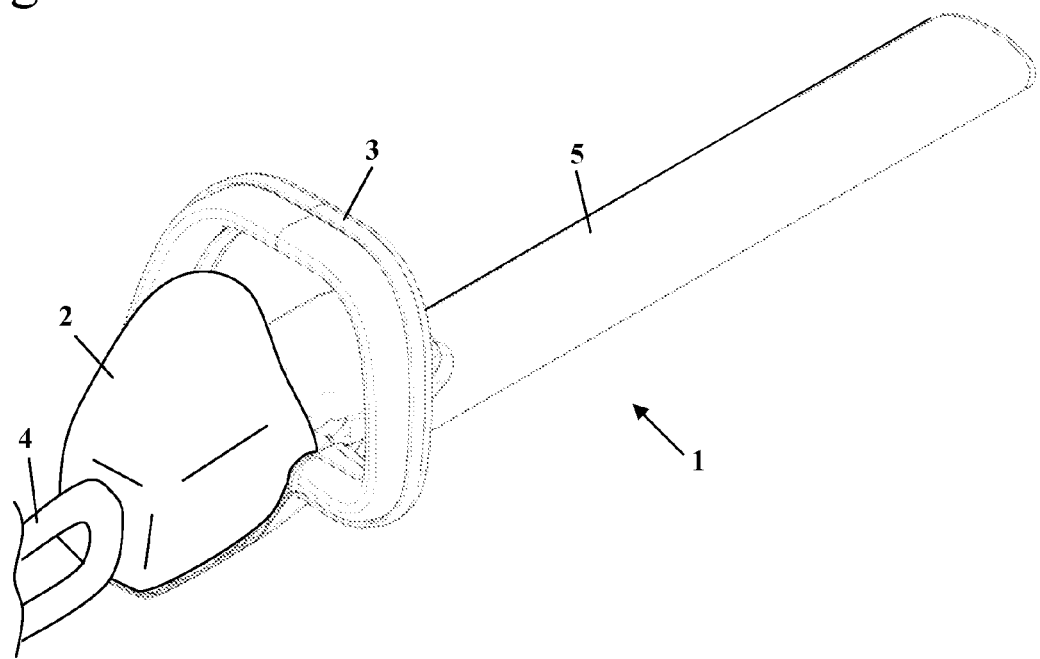
FIG. 1 is a schematic perspective illustration of a hedge trimmer.

FIG. 1 shows as an embodiment of a hand-held power tool a hedge trimmer 1. The configuration of the present invention can however also be used for other hand-held power tools, in particular hand-held power tools with an electrical drive motor.

The hedge trimmer 1 has a power tool housing 2, only schematically shown in FIG. 1, on which a rear handle 4 is arranged. At the end of the power tool housing 2 opposite the handle 4, a tool member projects forwardly, i.e., a cutter bar, that in the illustration of FIG. 1 is sheathed by a protective cover 5. In the area of the attachment of the cutter bar to the power tool housing 2, a bow-shaped grip 3 is secured to the power tool housing 2.

Figure 2:
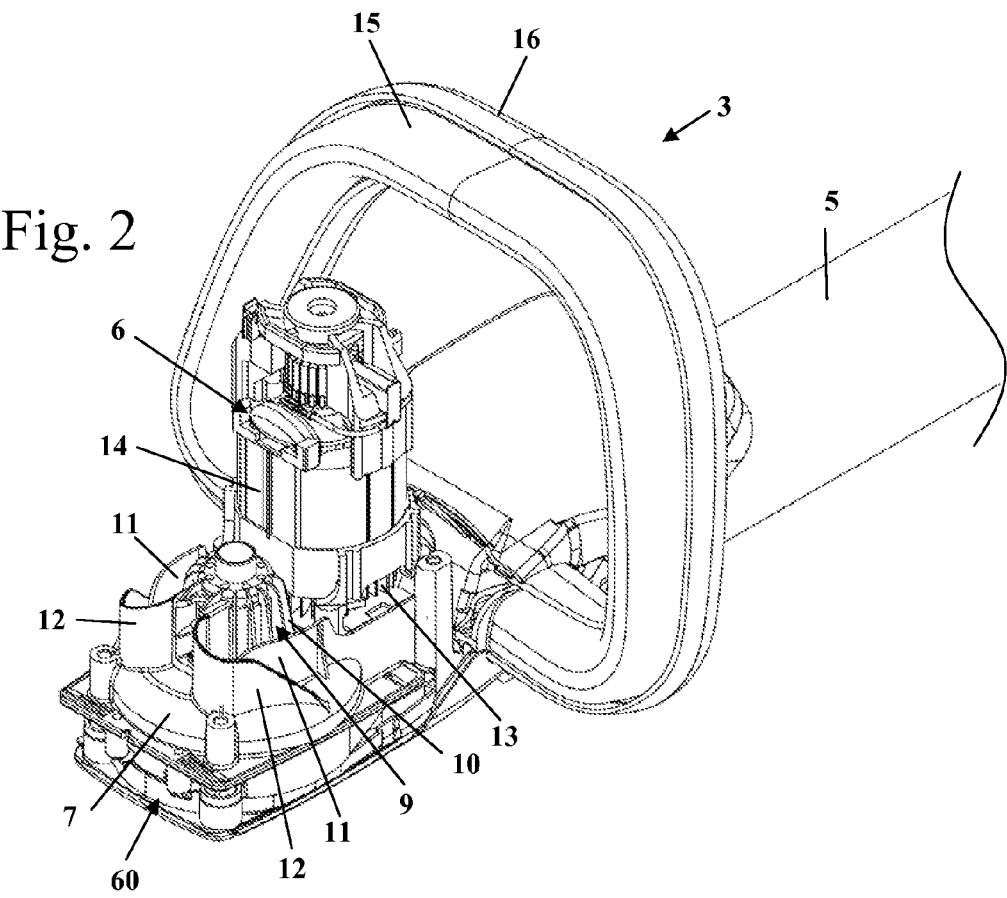
FIG. 2 shows the hedge trimmer of FIG. 1 with removed housing cover.

As shown the FIG. 2, the bow-shaped grip 3 is of a two-part configuration and has a first grip part 15 and a second grip part 16. The first grip part 15 is pivotably supported on the second grip part 16, is spring-loaded relative to it, and serves as a safety feature. When the two grip parts 15, 16 are not pressed together by the operator, the drive motor 6 will not operate. As shown a FIG. 2, the drive motor 6 arranged in the power tool housing 2 is embodied as an electric motor and has a lamination stack 14. The drive motor 6 operates a fan wheel 13 that is arranged underneath the lamination stack 14. The fan wheel 13 is arranged at the side of the drive motor 6 that is facing the gearbox 60. On the side of the drive motor 6 that is facing away from the cutter bar, a drive shaft housing 9 is arranged that is integrated into the gearbox housing 7. On the exterior side of the drive shaft housing 9, a plurality of cooling ribs 10 are arranged that extend transversely to the flow direction of the cooling air that is conveyed by the fan wheel 13. The cooling ribs 10 extend approximately radially to the axis of rotation 57 of the drive shaft 8 that is illustrated schematically in FIG. 3. On the topside of the gearbox housing 7, on either side of the drive shaft housing 9, first flow guiding ribs 11 and second flow guiding ribs 12 are arranged.

Figure 3:
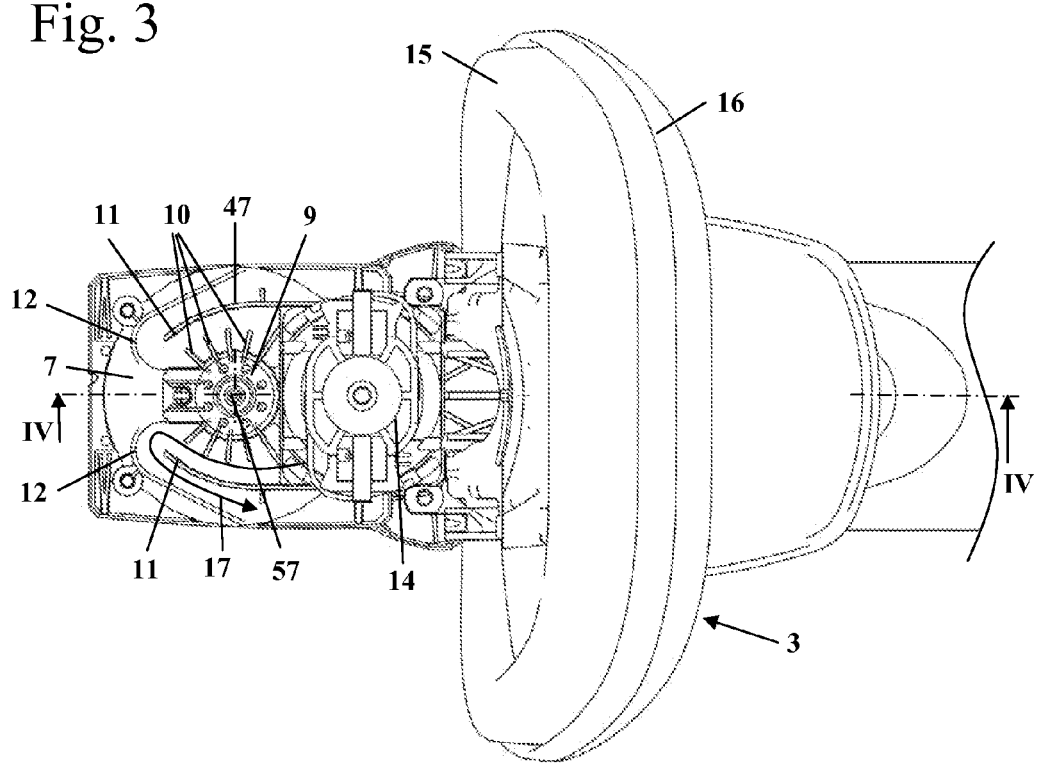
FIG. 3 is a plan view onto the hedge trimmer of FIG. 2.

As shown in FIG. 3, the flow guiding ribs 11, that are arranged symmetrical to each other on either side of the drive shaft housing 9, extend in a curved shape about the drive shaft housing 9, wherein the first flow guiding ribs 11 have a spacing to the cooling ribs 10 of the drive shaft housing 9. On the exterior side 47 of the flow guiding ribs 11 that is facing away from the drive shaft housing 9, one of the flow guiding ribs 12 extends, respectively. The flow guiding rib 12 adjoins the drive shaft housing 9 and deflects the cooling air flow along the arrow 17 past the exterior side 47 of the flow guiding rib 11. From this point, the cooling air flows through cooling air slots, not shown, laterally out of the power tool housing 2.

Figure 4:
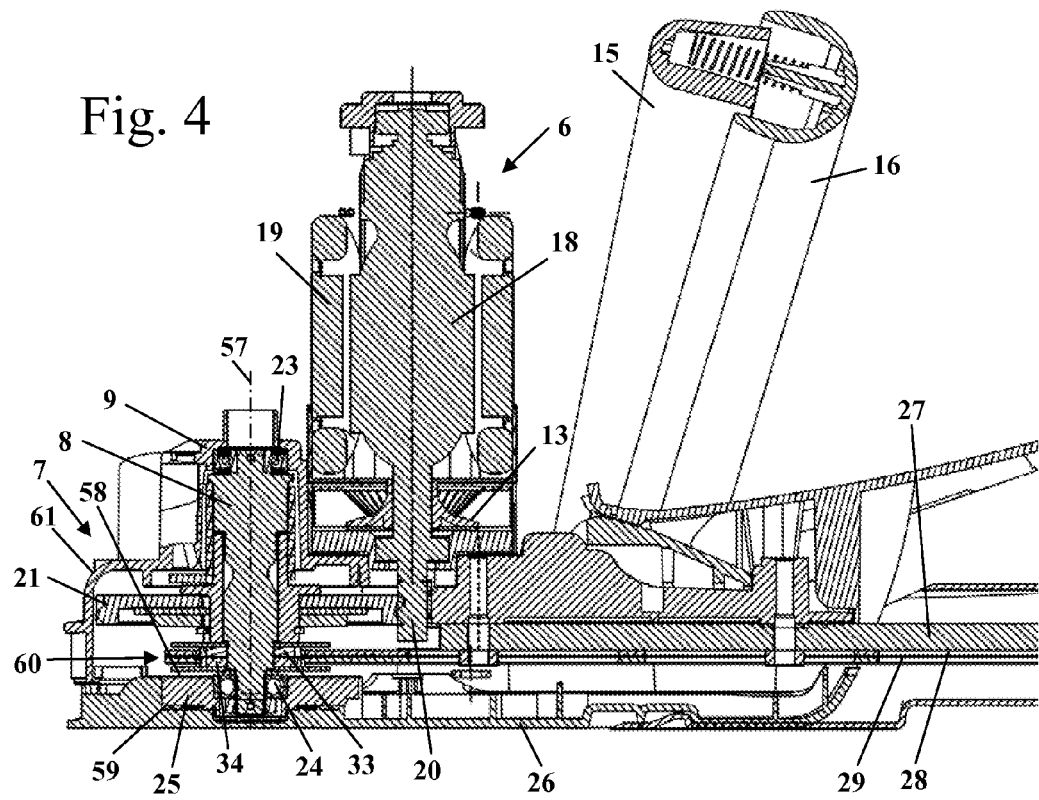
FIG. 4 is a section along the section line IV-IV of FIG. 3.

The section illustration of FIG. 4 shows the configuration of the hedge trimmer 1 in detail. The drive motor 6 is embodied as an inner rotor motor and has an inwardly positioned rotor 18 surrounded by stator 19. The fan wheel 13 is fixedly attached to the rotor 18. On the exterior circumference of the fan wheel 13 the cooling air conveyed by the fan wheel 13 can flow outwardly. Immediately adjacent to the drive motor 6 the drive shaft 8 is supported in the drive shaft housing 9. The drive shaft 8 is supported with a first lower bearing 24 in a housing bottom 26 of the power tool housing 2. A second upper bearing 23 of the drive shaft 8 is positioned in the drive shaft housing 9 adjacent to the fan wheel 13. The gearbox housing 7 is formed by a housing shell 61 with integrated drive shaft housing 9. In the downward direction, toward the side that is facing away from the drive motor 6, the gearbox housing 7 is closed by the housing bottom 26. The drive motor 6 has a drive pinion 20 that is a part of the rotor 18. The drive pinion 20 drives a gear 21 that is connected fixedly to the drive shaft 8. This fixed connection can be provided with an overload protection that allows for a relative rotation when an overload situation occurs.

On the drive shaft 8 two eccentrics 33, 34 are secured that drive the two cutter bar members 28 and 29 of the hedge trimmer 1. The cutter bar members 28 and 29 are held in a guide 27. The guide 27 is secured on the housing shell 61. For this purpose, at least one fastening screw, not illustrated in the Figures, is provided. On the side that is facing away from the guide 27 and facing the housing bottom 26, a cover strip can be arranged on the cutter bar members 28 and 29. The eccentrics 33, 34 drive the cutter bar members 28 and 29 in opposite directions in a reciprocating fashion. It can also be provided that only one of the cutter bar members 28, 29 is driven while the other cutter bar member is stationary.

Figure 5:
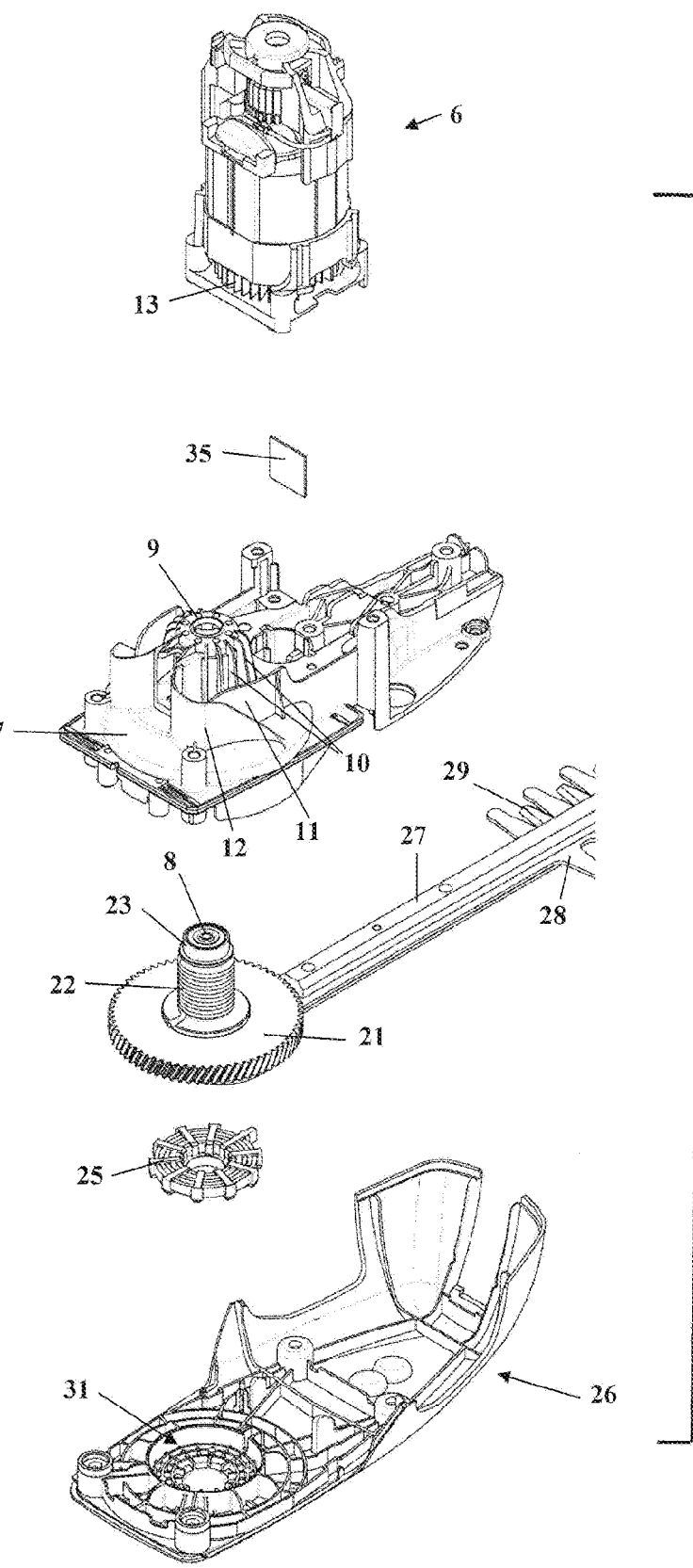
FIG. 5 is an exploded view of the hedge trimmer of FIG. 2.

As shown in the exploded view of FIG. 5, on the outer circumference of the drive shaft 8 a spring 22 is arranged that serves as a coupling. At the gearbox housing 7, adjacent to the drive pinion 20, an intermediate wall or partition 35 is inserted. As shown in FIGS. 4 and 5, the first lower bearing 24 is housed in an intermediate element 25 that is arranged in a receptacle 31 of the housing bottom 26. As shown in FIG. 5, the intermediate element 25 is of a disk shape and has a grid-shaped structure (first ribs 36, third ribs 37). On the bottom 44 of the receptacle 31 there is also a grid-shaped structure that is formed by ribs (second ribs 48, fourth ribs 45, fifth ribs 46).

Figure 6:
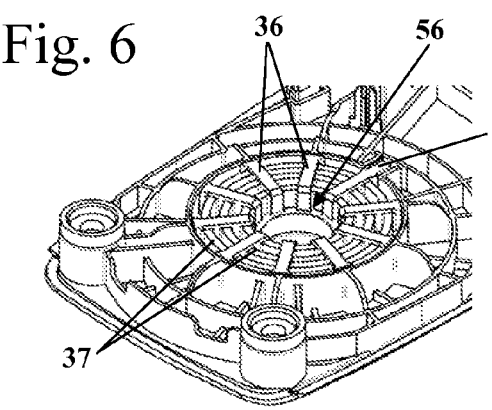
FIG. 6 is a perspective illustration of the housing bottom of the hedge trimmer with intermediate element arranged therein.

As shown in FIG. 6, the intermediate element 25 has first ribs 36 that, relative to the axis of rotation 57, extend in radial direction outwardly; the ribs 36 rest on second ribs 48 of the bottom 44. Third ribs 37 of the intermediate element 25 extend annularly, in the illustrated embodiment with a circular ring shape, and connect the first ribs 36 with each other. The intermediate element 25 has moreover a receiving space 56 for the bearing 24. For positionally securing the intermediate element 25 in the circumferential direction, one of the ribs 36 is longer and forms thus an outwardly projecting pin 40 that projects into an opening 41 formed on the circumference of the receptacle 31 and illustrated in FIG. 8; it secures in this way the rotational position of the intermediate element 25.

Figure 7:
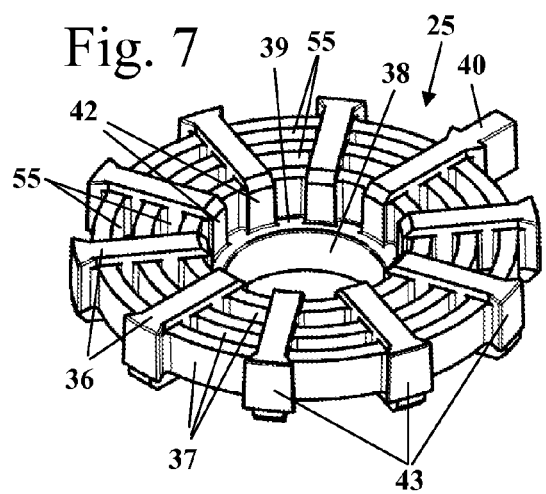
FIG. 7 is a perspective illustration of the intermediate element.

FIG. 7 shows the configuration of the intermediate element 25 in detail. Between the annular ribs 37 and the radially extending ribs 36, in the direction of the axis of rotation 57, openings 55 are formed. The radial ribs 36 project past the annular ribs 37 with their oppositely positioned flat sides 58 and 59 as well as with their inwardly positioned end faces 42 and their outwardly positioned end faces 43. The inner end faces 42 delimit the receiving space 56 for the bearing 24. The bearing 24 is therefore not supported across its entire circumference in the receiving space 56 but only supported on the end faces 42 of the ribs 36. The outer end faces 43 form a support surface relative to the circumferential wall of the receptacle 31. Accordingly, there is also no full surface contact at the wall of the receptacle 31. The intermediate element 25 is provided with a collar 38 that projects into a depression 62 at the bottom 44 of the receptacle 31. The collar 38 passes by means of a step 39 into the ribs 36 and 37. The step 39 forms an axial support surface for the bearing 24.

Figure 8:
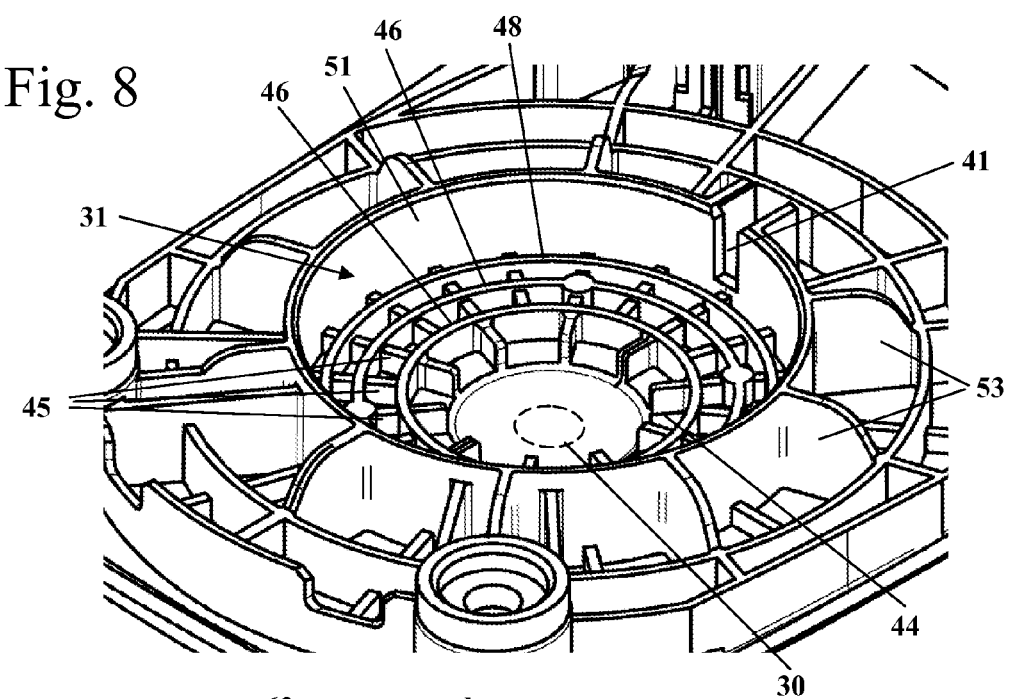
FIG. 8 is a perspective illustration of the receptacle for the intermediate element.

As shown in FIG. 8, at the bottom 44 of the receptacle 31 there is also a grid-shaped structure. The grid-shaped structure is formed by ribs 45 (fourth ribs) extending approximately radially to the axis of rotation 57 and annular ribs 46 (fifth ribs) and 48 (second ribs). In this connection, two inner annular ribs 46 and one outer annular rib 48 are provided. Centrally, the bottom 44 of the receptacle 31 can have an opening 30, shown in FIGS. 8 and 9 in dashed lines, that serves for guiding cooling air.

Figure 10:
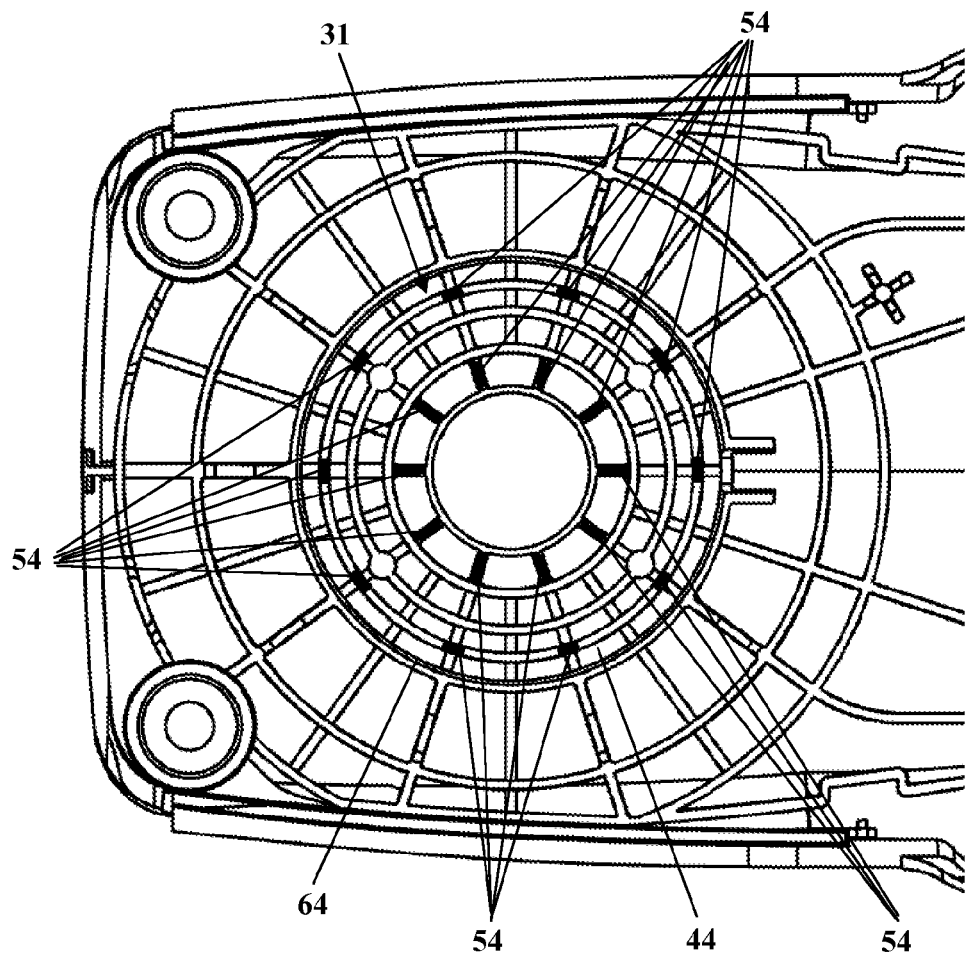
FIG. 10 is a plan view onto the housing bottom with marked support locations.

As shown in FIG. 10, the annular ribs 46 (fifth ribs) have a spacing d relative to the intermediate element 25. The radial ribs 45 (fourth ribs) have a spacing c relative to the intermediate element 25; the spacing c is greater than the spacing d. The intermediate element 25 is resting only on the outer rib 48 (second rib) as well as with a plurality of individual sockets 50 that project from the intermediate element 25 in downward direction on the grid structure that is formed at the bottom 44 of the receptacle 31. The sockets 50 are cylindrical and are uniformly distributed across the entire area that surrounds the collar 38. The sockets 50 are positioned on the radial ribs 45 (fourth ribs) so that individual support locations 54 that are separate from each other are formed. Corresponding support locations 54 exist between the annular rib 48 (second rib) and the radially extending ribs 36 (first ribs) of the intermediate element 25.

Figure 11:
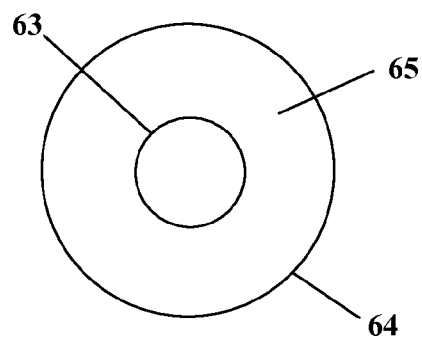
FIG. 11 is a schematic illustration of the circular ring surface.

In FIG. 10, the support locations 54 are illustrated. The support locations 54 form together a support surface on which the intermediate element 25 is supported relative to the bottom 44. The support surface made up of the support locations 54 is small compared to the size of the bottom 44 of the receptacle 31. The support surface (54) is less than approximately 50%, in particular less than approximately 40%, advantageously less than approximately 30%, in particular less than approximately 20%, of an imaginary circular ring surface 65 between the outer circumference 63 of the bearing 24 and a circumcircle 64 about the receptacle 31. In the shown embodiment, the support locations 54 extend across less than 10% of the circular ring surface. The circular ring surface 63 is schematically shown in FIG. 11. In the illustrated embodiment, the circumcircle 64 coincides with the circumferential wall 51. The circumcircle 64 is a circle having a center positioned on the axis of rotation 57 of the drive shaft 8; its radius corresponds to the spacing of the axis of rotation 57 relative to a point of the circumferential wall 51 that is farthest removed from the axis of rotation 57. The receptacle 31 is thus positioned completely within the imaginary circumcircle 64.

Figure 9:
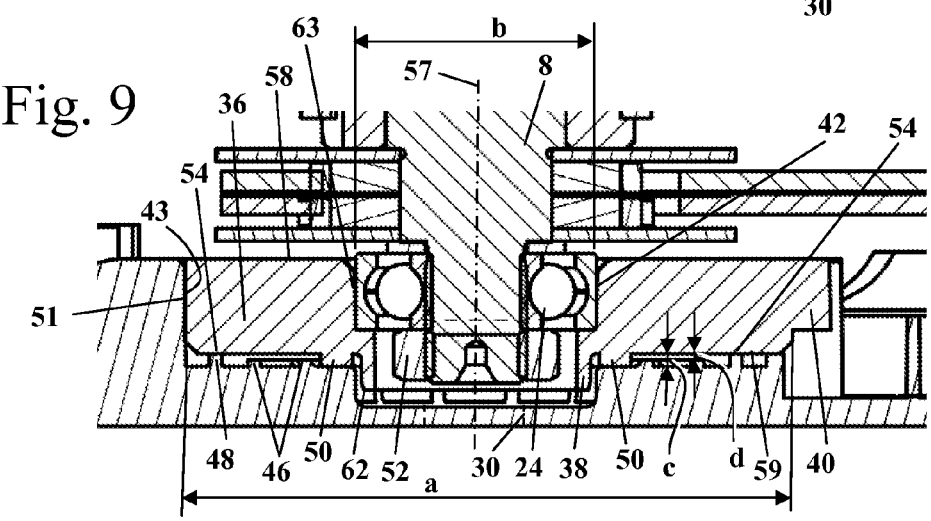
FIG. 9 is a sectioned detail view of the intermediate element and the surrounding area of the housing bottom.

FIG. 9 shows the contact of the outer end face 43 of the ribs 36 on the circumferential wall 51 of the receptacle 31. As shown in FIG. 9, the circumferential wall 51 is supported in the outward direction by approximately radially extending ribs 53.

As shown in FIG. 9, the drive shaft 8 in axial direction is secured by a nut 52 that is arranged in the area of the collar 38 of the intermediate element 25.

As shown in FIG. 9, the outer diameter a of the intermediate element 25 is significantly greater than the outer diameter b of the bearing 24. In this way, the heat that is produced in the bearing 24 can be dissipated across a large surface area. The intermediate element 25 is made of a plastic material that is more heat-resistant than the plastic material of the housing bottom 26 with its receptacle 31. Advantageously, the intermediate element 25 is comprised of polyamide, in particular polyamide 6.6, and the power tool housing of polypropylene. The intermediate element 25 and/or the power tool housing 2 may be glass fiber-reinforced.

The specification incorporates by reference the entire disclosure of German priority document 10 2011 014 068.9 having a filing date of Mar. 16, 2011.

While specific embodiments of the invention have been shown and described in detail to illustrate the inventive principles, it will be understood that the invention may be embodied otherwise without departing from such principles.

What is claimed is:

1. A hand-held power tool comprising:
a power tool housing comprised at least partially of plastic material;
a drive motor arranged in said power tool housing;
a drive shaft operatively connected to said drive motor;
at least one tool member operatively connected to said drive shaft to be driven by said drive motor through said drive shaft;
a first bearing supporting said drive shaft relative to said power tool housing so as to be rotatable about an axis of rotation, wherein said first bearing comprises an outer circumference and further comprises an inner circumference arranged on an outer circumference of said drive shaft;
an intermediate element supporting said first bearing relative to said power tool housing;
said intermediate element arranged in a receptacle of said power tool housing, wherein said receptacle comprises a bottom and said bottom comprises a support surface;
said intermediate element supported on said support surface relative to said bottom of said receptacle;
wherein said receptacle comprises a circumcircle having its center on said axis of rotation and having a radius that corresponds to a spacing of the farthest removed point of said receptacle relative to said axis of rotation;
wherein, viewed in a viewing direction in which said axis of rotation extends, said power tool comprises a circular ring surface,
wherein said circular ring surface, viewed in said viewing direction, is defined by a center point, an inner circle, and an outer circle;
wherein, viewed in said viewing direction, said axis of rotation is said center point, said inner circle is said outer circumference of said first bearing, and said outer circle is said circumcircle of said receptacle;
wherein said radius of said circumcircle is greater than the radius of said inner circle;
wherein the entire surface area of said support surface of said bottom amounts to less than 30% of the surface area of said circular ring surface.

2. The power tool according to claim 1, wherein said intermediate element is comprised of a first plastic material and said receptacle is comprised of a second plastic material and wherein said first plastic material of the intermediate element has a higher thermal resistance than said second plastic material of said receptacle.

3. The power tool according to claim 1, wherein said support surface is formed by individual support locations that are separate from each other, wherein said intermediate element is resting on said individual support locations.

4. The power tool according to claim 3, wherein said intermediate element has at least one first rib and said receptacle has a second rib arranged on said bottom, wherein said intermediate element is resting with said at least one first rib on said second rib.

5. The power tool according to claim 4, wherein said second rib crosses said at least one first rib of said intermediate element at a crossing point and wherein said crossing point forms one of said individual support locations.

6. A hand-held power tool, comprising:
a power tool housing comprised at least partially of plastic material;
a drive motor arranged in said power tool housing;
a drive shaft operatively connected to said drive motor;
at least one tool member operatively connected to said drive shaft to be driven by said drive motor through said drive shaft;
a first bearing supporting said drive shaft relative to said power tool housing so as to be rotatable about an axis of rotation, wherein said first bearing comprises an outer circumference;
an intermediate element supporting said first bearing relative to said power tool housing;
said intermediate element arranged in a receptacle of said power tool housing, wherein said receptacle comprises a bottom and said bottom comprises a support surface;
said intermediate element supported on said support surface relative to said bottom of said receptacle;
wherein said receptacle comprises a circumcircle having its center on said axis of rotation and having a radius that corresponds to a spacing of the farthest removed point of said receptacle relative to said axis of rotation;
wherein, viewed in a viewing direction in which said axis of rotation extends, said power tool comprises a circular ring surface;
wherein said circular ring surface, viewed in said viewing direction, is defined by a center point, an inner circle, and an outer circle;
wherein, viewed in said viewing direction, said axis of rotation is said center point, said inner circle is said outer circumference of said first bearing, and said outer circle is said circumcircle of said receptacle;
wherein said radius of said circumcircle is greater than the radius of said inner circle, wherein the entire surface area of said support surface of said bottom amounts to less than 50% of the surface area of said circular ring surface;
wherein said intermediate element has a plurality of recesses extending in said viewing direction.

7. The power tool according to claim 6, wherein said recesses are openings extending through said intermediate element, wherein cooling air passes through said openings.

8. The power tool according to claim 1, wherein said intermediate element has first ribs and third ribs that cross each other and form a grid-shaped structure.

9. The power tool according to claim 8, wherein said first ribs project in at least one direction past said third ribs.

10. The power tool according to claim 8, wherein said first ribs extend outwardly in a radial direction relative to said axis of rotation of said drive shaft and said third ribs are annular.

11. The power tool according to claim 9, wherein said third ribs include a radially inwardly positioned third rib and a radially outwardly positioned third rib, wherein said intermediate element is disk-shaped, wherein said first ribs have outwardly facing end faces that project past said outwardly positioned third rib, wherein said first ribs have inwardly facing end faces that project past said inwardly positioned third rib, and wherein said inwardly positioned end faces of said first ribs define a receiving space for said first bearing.

12. The power tool according to claim 8, wherein on said bottom of said receptacle at least one fourth rib is arranged that crosses said third ribs, when viewed in said viewing direction, wherein said at least one fourth rib has a first spacing relative to said intermediate element.

13. The power tool according to claim 12, wherein on said bottom of said receptacle at least one fifth rib is arranged that crosses said at least one fourth rib, wherein said at least one fifth rib has a second spacing relative to said intermediate element.

14. The power tool according to claim 1, comprising a second bearing and a drive shaft housing, wherein said second bearing is secured in said drive shaft housing and said drive shaft is supported on said second bearing, wherein said drive shaft housing has an exterior side provided with at least one cooling rib.

15. The power tool according to claim 14, wherein, adjacent to said drive shaft housing, at least one first flow guiding rib is arranged that guides a cooling air flow conveyed by a fan wheel across said at least one cooling rib.

16. The power tool according to claim 15, wherein at least one second flow guiding rib is provided that guides the cooling air flow across at least one section of a side of said at least one first flow guiding rib, wherein said side is facing away from said cooling rib.

* * * * *